United States Patent [19]

DeGood et al.

[11] Patent Number: 4,512,491

[45] Date of Patent: Apr. 23, 1985

[54] DUAL RANGE RUPTURE DISC ASSEMBLY

[75] Inventors: Robert L. DeGood, Lee's Summit; Eddie R. Malcolm, Independence, both of Mo.

[73] Assignee: Fike Metal Products Corporation, Blue Springs, Mo.

[21] Appl. No.: 570,985

[22] Filed: Jan. 16, 1984

[51] Int. Cl.³ .............................................. B65B 25/00
[52] U.S. Cl. .................................. 220/89 A; 137/68 R
[58] Field of Search ........................ 220/89; 137/68, 67

[56] References Cited

U.S. PATENT DOCUMENTS

| | | | |
|---|---|---|---|
| 2,224,748 | 12/1940 | Sauer | 220/89 A |
| 2,553,267 | 5/1951 | Nedoh | 220/89 A |
| 3,091,359 | 5/1963 | Wood | 220/89 A |
| 3,484,817 | 12/1969 | Wood | 220/89 A |
| 3,704,807 | 12/1972 | Lidgard | 220/89 A |
| 3,834,580 | 9/1974 | Ludwig et al. | 220/89 A |
| 4,301,938 | 11/1981 | Wood et al. | 220/89 A |
| 4,434,905 | 3/1984 | Ou et al. | 220/89 A |

FOREIGN PATENT DOCUMENTS 844393 8/1960 United Kingdom ............. 220/89 A

*Primary Examiner*—Stephen Marcus
*Assistant Examiner*—Robert Petrik

*Attorney, Agent, or Firm*—Schmidt, Johnson, Hovey & Williams

[57] ABSTRACT

A two directional rupture disc assembly is provided which serves in a fluid reactor system as a safety relief valve when a critical condition, such as predetermined pressure positive or negative, is encountered. That is, the rupture disc assembly hereof is operatively coupled to a reactor vessel and allows fluid flow in one direction when one reactor system condition is encountered and allows fluid flow in an opposite direction when another reactor system condition is encountered. Thus, under normal conditions, the reactor system operates in a certain pressure range with the assembly hereof in flow blocking disposition, but if a reactor condition outside of the normal operating range is encountered, the assembly ruptures to permit fluid flow in the appropriate direction. Preferably, the rupture disc assembly includes a pair of flat rupture discs and an imperforate membrane between the two discs. Each disc includes an innermost and outermost C-shaped pattern formed by a plurality of serially arranged slots through the respective disc. Advantageously, the discs and membrane are mounted and the patterns manufactured such that the discs rupture adjacent the outermost pattern when one condition is encountered and the discs rupture adjacent the innermost pattern when another condition is encountered.

7 Claims, 7 Drawing Figures

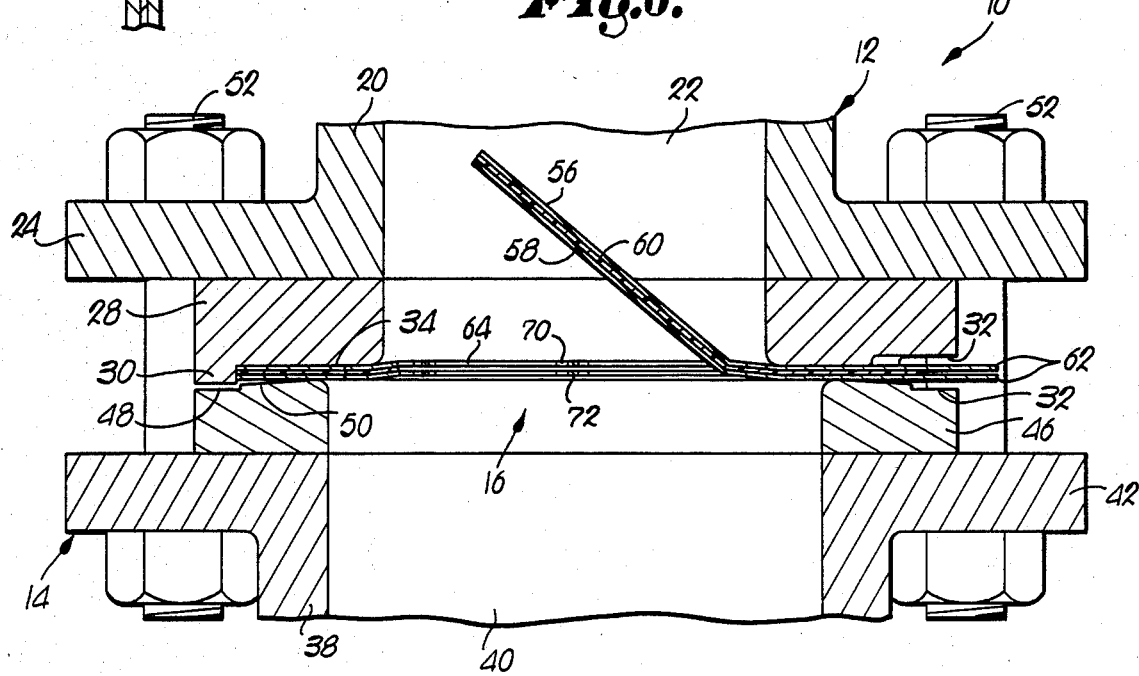

DUAL RANGE RUPTURE DISC ASSEMBLY

BACKGROUND OF THE INVENTION

1. Field of the Invention

This invention relates to a two directional pressure relief assembly for use in a fluid reactor system which has numerous advantages including the ability to act as a safety pressure relief device in either of two directions. That is, with the assembly hereof coupled to a reactor vessel, the assembly will relieve either an overpressure condition or an underpressure condition, with the assembly hereof allowing a large normal operating range in the reactor vessel.

2. Description of the Prior Art

In a chemical reactor system or similar application, it is usually necessary to provide some sort of safety device coupled to the reactor vessel to prevent a critical condition from occurring in the reactor vessel. Typically, such a critical condition has been an abnormal overpressure within the reactor vessel with the safety device operable to relieve the overpressure within the reactor vessel to prevent catastrophic failure. Conventional rupture discs are widely used in such applications, to prevent such a critical overpressure from occurring. That is, such conventional rupture discs are designed to burst at a predetermined pressure according to the needs of a particular application, and are coupled to the reactor vessel to burst and provide emergency pressure relief when the predetermined pressure is encountered.

In many reactor systems, however, it is necessary to not only provide emergency relief to prevent an overpressure from occurring, but additionally, it is necessary to prevent an underpressure from occurring. That is, in an integrated reactor system in which a particular reactor vessel operates under conditions dependent upon downstream or upstream conditions, it may be necessary to provide pressure relief when certain underpressure or overpressure relationship occurs between the particular reactor vessel and upstream or downstream conditions. For example, the normal pressure operating range for a reactor vessel might fluctuate relative to a downstream reactor vessel or system from 5 psi less than the downstream operating pressure to 5 psi greater than the downstream operating pressure (e.g. [−5 psi, +5 psi]). In such a system, it is desirable to provide emergency pressure relief when the operating pressure differential deviates either way from the normal range.

Similarly, many processes involve reactions with fluctuations of the reactor vessel pressure within a critical operating range irregardless of upstream or downstream conditions. It will be appreciated that this operating range can include pressures below atmospheric as well as elevated pressures. In such types of reactor vessels, it is therefore necessary to allow the vessel to operate in the normal operating range, but to prevent operation outside of that range, by monitoring the vessel pressure relative to atmospheric pressure.

One solution to protecting such a reactor vessel from both relative underpressure and overpressure has been simply to provide two conventional rupture disc assemblies, one for operation in an overpressure situation, and the other for operation in an underpressure situation. Although such a solution is effective in some instances, it will be appreciated that in many reactor systems because of cost constraints, space restraints, and/or the necessary pressure interdependencies within the integrating reactor system, this approach is not the most desirable or even feasible.

Another proposed solution to achieving full range protection for a reactor vessel has been to use one rupture disc assembly with two rupture discs mounted in the relief passageway connected to the reactor vessel. Such a device is illustrated in U.S. Pat. No. 3,091,359. In such devices, the rupture disc assembly typically comprises two perforated discs with an imperforate sealing membrane disposed therebetween. The downwardly bowed disc nearest the reactor vessel is designed to rupture as it reverses at a low pressure differential (underpressure condition), while the upwardly bowed disc on the other side of the sealing membrane, remote from the reactor vessel, does not undergo reversal and is designed to rupture at a high pressure differential (overpressure condition). In an underpressure situation, the pressure differential causes the membrane to distend against the lowermost disc, which bursts at its design limit to relieve the underpressure situation. Similarly, in an overpressure situation, the pressure differential results in distention of the membrane to a position against the upermost disc followed by bursting of the uppermost disc when the design pressure differential limit is exceeded.

A number of significant problems, however, exist with use of such past devices. First, in practice it has been found that the difference between the two designed burst pressure differentials for the two discs is somewhat limited. Thus, such past devices have not been effective in use with certain reactor systems which operate over relatively wide normal pressure ranges. Secondly, such past devices have not always been effective in providing the immediate full pressure relief necessary. Typically, this problem has manifested itself in the underpressure situation in which the lowermost disc ruptures, but the pressure is not high enough to rupture the uppermost disc which was designed to withstand a high pressure differential. Thus, the fluid must flow through the perforations in the uppermost disc which does not provide the full bore pressure relief which is desirable of not in fact essential to alleviate many abnormal operating conditions. Thus, a significant contribution to the art can be made by the provision of a single device which is capable of allowing operation of the reactor vessel over a wide pressure operating range and which provides immediate full bore relief when either a relative overpressure or underpressure condition occurs outside of the normal operating parameters.

SUMMARY OF THE INVENTION

The problems outlined above are in large measure solved by the pressure relief assembly in accordance with the present invention. The rupture disc assembly of the present invention is a single unit which allows the reactor vessel to operate over a wide relative pressure differential range. Further, the rupture disc assembly hereof provides for immediate full bore relief in either direction if the design pressure differential limits are exceeded.

The pressure relief assembly in accordance with the present invention broadly includes first and second support members each having a bore therethrough, with the support members coupled such that the bores define a passageway. Advantageously, the bore of the second member presents a larger cross-sectional dimension than the first such that with the support members coupled, a flange is defined by the portion of the first member circumscribed by the second member bore. The assembly further includes pressure relief structure which normally blocks fluid flow through the passageway, but which ruptures in response to certain pressure differentials thereacross. The relief structure includes means defining an innermost burst pattern and an outermost burst pattern, with the assembly including components for mounting the relief structure between the first and second members with portions of the outermost burst pattern abutting the flange. The relief structure operates to rupture adjacent the innermost burst pattern in response to a first pressure differential and ruptures adjacent the outermost burst pattern in response to a second pressure differential. Preferably, the first pressure differential amount is greater than the second pressure differential amount such that the relief structure will rupture adjacent the outermost pattern in response to the second pressure differential, and rupture adjacent the innermost pattern in response to the first pressure differential with the flange preventing rupture adjacent the outermost pattern.

In particularly preferred forms, the first and second member bores present concentric cylinders, with the second member bore having a greater diameter than the first member bore. Preferably, the relief structure comprises first and second generally flat rupture discs with an imperforate flexible membrane disposed between the two discs. The structure defining the innermost and outermost burst patterns on the discs comprises a plurality of elongated slots extending therethrough. Advantageously, the slots are serially spaced apart to present an innermost C-shaped pattern and an outermost C-shaped pattern, with the outermost pattern being concentric to and spaced apart from the innermost pattern. It will be appreciated that the structure of the present invention allows the reactor vessel to operate under a wide pressure range including relative negative pressures, and provides immediate emergency relief when pressure conditions outside the normal operating range are encountered.

BRIEF DESCRIPTION OF THE DRAWING

FIG. 4 is a sectional view taken along line 4—4 of FIG. 3 and illustrates the sealing engagement of the membrane along the outermost and innermost patterns;

FIG. 5 is a sectional view taken along line 5—5 of FIG. 3 and depicts the tab structure between adjacent slots of the innermost pattern;

FIG. 6 is a vertical sectional view of the present invention after rupture adjacent the innermost pattern; and FIG. 7 is a vertical sectional view of the present invention illustrating rupture adjacent the outermost pattern of the relief means.

DESCRIPTION OF THE PREFERRED EMBODIMENT

Figure 1:
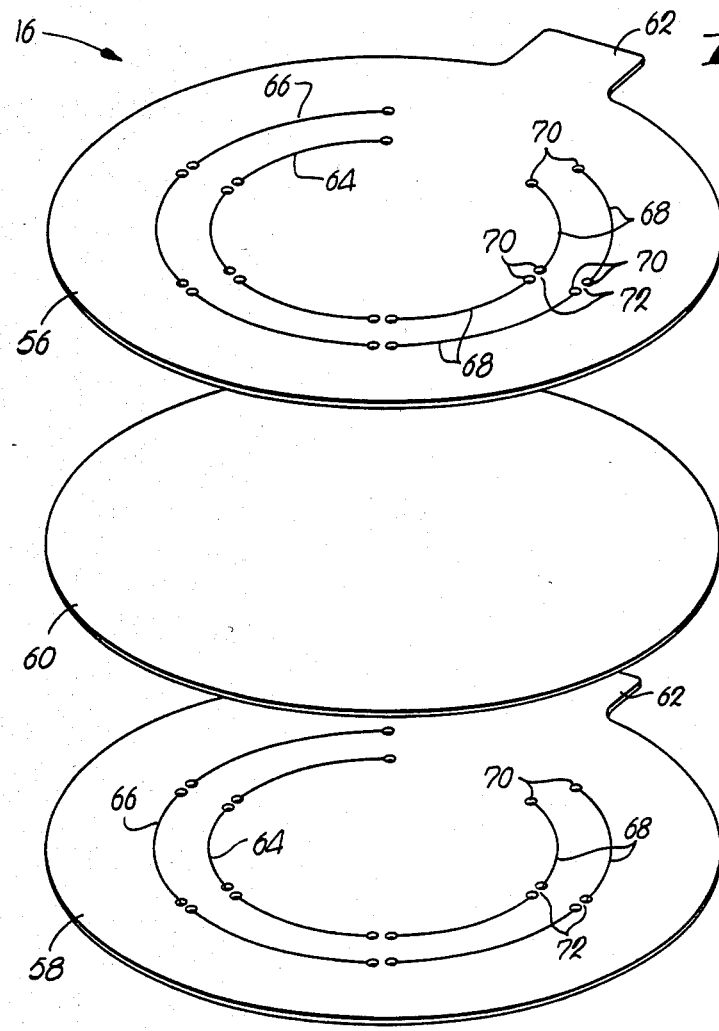
FIG. 1 is a perspective, exploded view of the rupture disc and perforate membrane of the relief structure of the present invention.

Referring now to the drawing, a pressure relief assembly 10 in accordance with the invention broadly includes a first support structure 12, a second support structure 14, and relief means 16 operably mounted between the first and second support structures 12, 14. Preferably, the support structure 14 is operatively coupled to a reactor vessel by a suitable duct structure, while the support structure 12 is operatively coupled to communicate with a relief conduit, the atmosphere or another reaction process.

Figure 2:
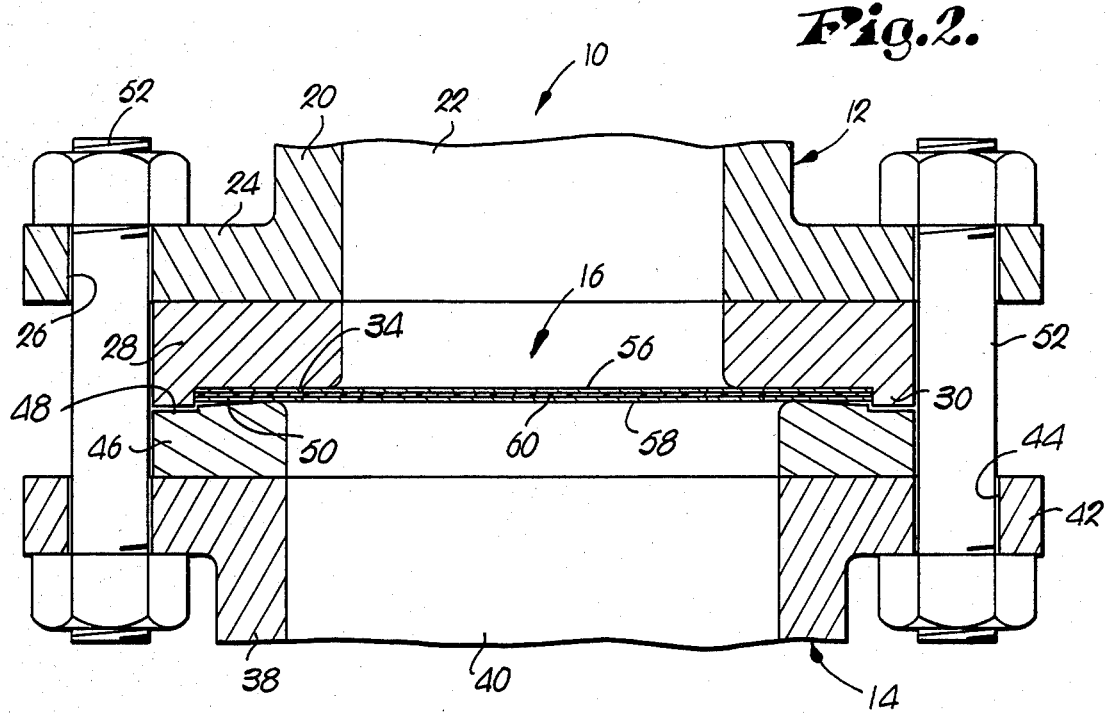
FIG. 2 is a vertical sectional view of the pressure relief assembly hereof.

In more detail, the first support structure 12 includes a tubular body 20 defining a circular in cross-section bore 22 therethrough. Further, the support structure 12 includes an annular shoulder 24 extending radially outward from the tubular body 20 and forming a part of the distal end thereof. The shoulder 24 includes a plurality of apertures 26 extending therethrough, as shown in FIG. 2. The support structure 12 further includes an annular ring 28 mounted to the shoulder 24 and dimensioned such that the bore 22 extends through and is defined by a joinder of the tubular body 20 and ring 28. The axial face of the ring 28 remote from shoulder 24 includes an axially oriented annular lip 30 disposed circumferentially at the outermost margin of the ring 28. As shown in FIGS. 6–7, the lip 30 is discontinuous from the annular ring 28 and includes a slight recess 32 along a portion thereof in place of the lip 30. Advantageously, the ring 28 further presents a flange 34 extending radially inward from the lip 30 to the bore 22.

The second support structure 14 is similar in most regards to the first support structure 12 and includes a tubular body 38 defining a circular in cross-section bore 40 therethrough. As is most apparent from the drawings, the bore 40 has a larger diameter than the bore 22 of the support structure 12, for purposes which will be made clear.

An annular shoulder 42 forms a part of the tubular body 38 at the distal end thereof, extending radially outward therefrom. Advantageously, the shoulder 42 presents a plurality of apertures 44 extending therethrough as shown in FIG. 2. Disposed against the annular shoulder 42 is an annular ring 46 dimensioned such that the joinder of the body 38 and ring 46 together define the bore 40. The axial surface of the ring 46 remote from the body 38 presents an outermost circumferential groove 48 for receiving the lip 30 of the support structure 12 upon assembly. The axial surface of the ring 46 extends radially inwardly from the groove 48 and presents an inclined engagement surface 50. It will be appreciated that the two support structures 12, 14 are coupled together by means of conventional nut and bolts 52 extending through respectively aligned apertures 26, 44 (see FIG. 2).

Turning now to the relief means 16, it will be seen viewing FIG. 1 that the relief means 16 broadly includes a pair of flat, circular in cross-section, rupture disc elements 56, 58 with an imperforate flexible membrane 60 mounted between the respective discs 56, 58. Preferably, the rupture discs 56, 58 are composed of a suitable metal such as stainless steel or tantalum, while the flexible membrane is composed of a suitable material such as tetrafluoroethylene fluorocarbon polymer (DuPont's Teflon polymer being an example). It should be appreciated that in the preferred embodiment the rupture discs 56, 58 are structurally identical; therefore only the rupture disc 56 need be explained in detail.

Figure 3:
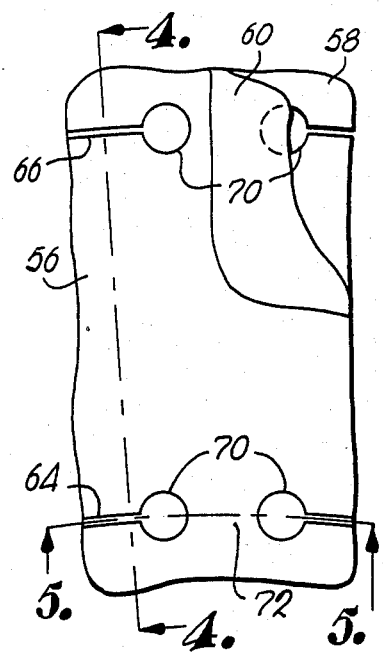
FIG. 3 is a fragmentary, enlarged view of the improved relief structure hereof and illustrates the relative distances between the pattern defining slots.

The rupture disc 56 is generally circular with a radially outward extending margin 62 as shown in FIG. 1. Disc 56 includes an innermost C-shaped line of weakness defining an inboard burst pattern 64 and an outermost C-shaped line of weakness presenting an outboard burst pattern 66, with the patterns being generally concentrically oriented. Each pattern 64, 66 is generally defined by a plurality of serially arranged slots 68 extending through the disc 56, with each slot terminating at its respective distal ends at an aperture 70. The portion of the metallic rupture disc 56 between adjacent apertures 70 presents a tab structure broadly denoted as 72 in FIG. 3. It should be appreciated that the tabs 72 in the outermost pattern 66 are not necessarily of the same dimension as the tap portions 72 of the innermost pattern 64. Those skilled in the art will appreciate that the dimensions of the tab portion 72 is a major factor in determining the burst rating for the respective patterns 64, 66.

Each rupture disc 56, 58 is manufactured in accordance with the particular job requirement, and preferably so marked on the margin 62. Thus, it is to be understood that the innermost pattern 64 preferably has a series of tab dimensions 72 according to the particular application, and similarly, the outermost pattern 66 would have another series of tab dimensions 72 in accordance with the job requirement. Similarly, the thickness of the discs 56, 58 as well as the material used to construct the discs 56, 58 and membrane 60 may be varied according to job specifications. The discs 56, 58 are assembled with the membrane 60 sandwiched therebetween in generally layered relationship. The relief means 16 is then mounted between the respective support structures 12, 14 with the margin 62 disposed in the recess 32 and the outermost edges of the discs 56, 58 generally adjoining and secured by the lip 30. Further, it will be seen from the drawing that the innermost pattern 64 of the rupture disc 56 communicates with the bore 22 while the outermost pattern 66 of the disc 56 abuts and is secured by the flange 34 of the ring 28. That is, the flange 34 supports the discs 56, 58 and membrane 60 in the region of the outermost pattern 66 to prevent rupture adjacent the outermost pattern 66 in the direction of bore 22. The ring 46 in a similar fashion adjoins the rupture disc 58; however, the engagement surface 50 contacts the disc 58 outboard of the outermost pattern 66, such that both the innermost and outermost patterns 64, 66 of the disc 58 communicate with the bore 40.

In operation, the support structure 14 is secured to a reactor vessel to be protected, or coupled thereto by suitable duct work, while the first support structure 12 is connected either to a downstream reactor vessel, a relief conduit or vented to the atmosphere. In any event, the preferred use of the pressure relief assembly 10 is with a reactor vessel which normally operates under a fluctuating pressure range. Those skilled in the art will appreciate that the reactor vessel may be normally operating in either a positive pressure or a vacuum condition. Alternatively, if the bore 22 communicates with another reaction process, the fluid pressure in the bore 40 may fluctuate from an amount less than the fluid pressure in the bore 22 to a fluid pressure greater than the fluid pressure in the bore 22. It will be appreciated that the tabs 72 in the patterns 64, 66 should therefore be dimensioned according to each application to allow pressure fluctuations in the normal operating range without rupture of the relief means 16.

An overpressure condition occurs when the fluid pressure within the bore 40 exceeds the fluid pressure within the bore 22 by a predetermined amount. The tabs 72 of the innermost pattern 64 are designed with this standard in mind, and accordingly, the discs 56, 58 and membrane 60 rupture adjacent the region of the innermost pattern 64 when this predetermined pressure differential amount is encountered. As shown in FIG. 6, the discs 56, 58 rupture into the bore 22 providing a path for fluid flow from the bore 40 into the bore 22, thus relieving the overpressure situation. Advantageously, the flange 34 prevents the discs 56, 58 from rupturing adjacent the outermost pattern 66. Similarly, an underpressure condition is herein defined as when the fluid pressure in the bore 22 exceeds the fluid pressure in the bore 40 by a predetermined amount. When this predetermined pressure differential is reached, discs 56, 58 are designed to rupture adjacent the outermost pattern 66 as shown in FIG. 7. Thus, fluid flow is possible from the bore 22 into the bore 40 and relieves the underpressure condition. It will be appreciated that in the preferred embodiment, the innermost pattern 64 is designed to rupture at a high pressure differential value (e.g. relatively large dimensions of tabs 72 of innermost pattern 64), while the outermost pattern 66 ruptures at a relatively lower pressure differential value. Thus, as shown in FIG. 7, when an underpressure condition is encountered, the discs 56, 58 rupture adjacent the outermost pattern 66 and not the innermost pattern 64 because of the designed strength differences therebetween.

In use, it has been found that the pressure relief assembly 10 in accordance with the present invention has yielded satisfactory results in allowing a broad pressure operation range in the reactor vessel, while affording adequate protection against both an overpressure or underpressure condition. Thus, the assembly 10 hereof has been found to yield full bore pressure relief when conditions warrant, and yet allows a large difference between the two pressure differential burst values at which the respective innermost and outermost patterns 64, 66 will rupture.

Although the preferred embodiments of the invention as illustrated in the drawings involve the provision of transversely circular bore defining components and correspondingly circular rupture relief means, it can readily be appreciated that the bore defining components and therefore the rupture disc means may be of rectangular configuration with the burst patterns also being of complemental rectangular shape.

We claim:

1. A pressure relief assembly comprising:
    elongated support structure including means defining a bore therethrough of desired cross-sectional configuration, and flange means extending into said bore presenting a peripheral abutment face;
    bidirectional relief means for normally preventing fluid flow through said bore, and for bursting in the event of a pressure differential thereacross of preselected magnitude, said relief means including a frangible element having first inner unsupported line of weakness defining an inboard burst pattern and a second distinct, separately operable outboard line of weakness presenting an outboard burst pattern, said first burst pattern being located closer to the center of said element than said second burst pattern; and
    means for mounting said element across said bore in normal flow blocking relationship thereto, with the outer periphery of said element, and the entirety of said second outboard line of weakness defining the outer burst pattern being adjacent to and supported against movement in one direction by said flange abutment face.

2. The assembly as set forth in claim 1, said support structure comprising a pair of separate, interconnected, tubular support members cooperatively presenting said bore.

3. The assembly as set forth in claim 1, said support members each being generally circular in cross-section, and said outboard burst pattern being generally circular in plan.

4. The assembly as set forth in claim, said relief means including first and second, generally flat, opposed, rupture discs each having corresponding inboard and outboard burst patterns respectively, and a substantially imperforate, flexible membrane interposed between said first and second discs.

5. The assembly as set forth in claim 1, said inboard and outboard burst patterns comprising score lines formed in said element.

6. The assembly as set forth in claim 1, said inboard and outboard burst patterns comprising structure defining a plurality of elongated slots extending through said element.

7. The assembly as set forth in claim 1, said inboard burst pattern being configured for rupturing of said element in the event of a relatively high pressure differential across said element, which generates a force against the face of said element remote from said flange abutment face, said outboard burst pattern being configured for rupturing of said element in the event of a relatively low pressure differential across said element which generates a force against the face of said element proximal to said flange abutment face.

* * * * *